June 13, 1933.     W. J. LANNES, SR     1,913,810
HARPOON
Filed Jan. 9, 1933     2 Sheets-Sheet 1
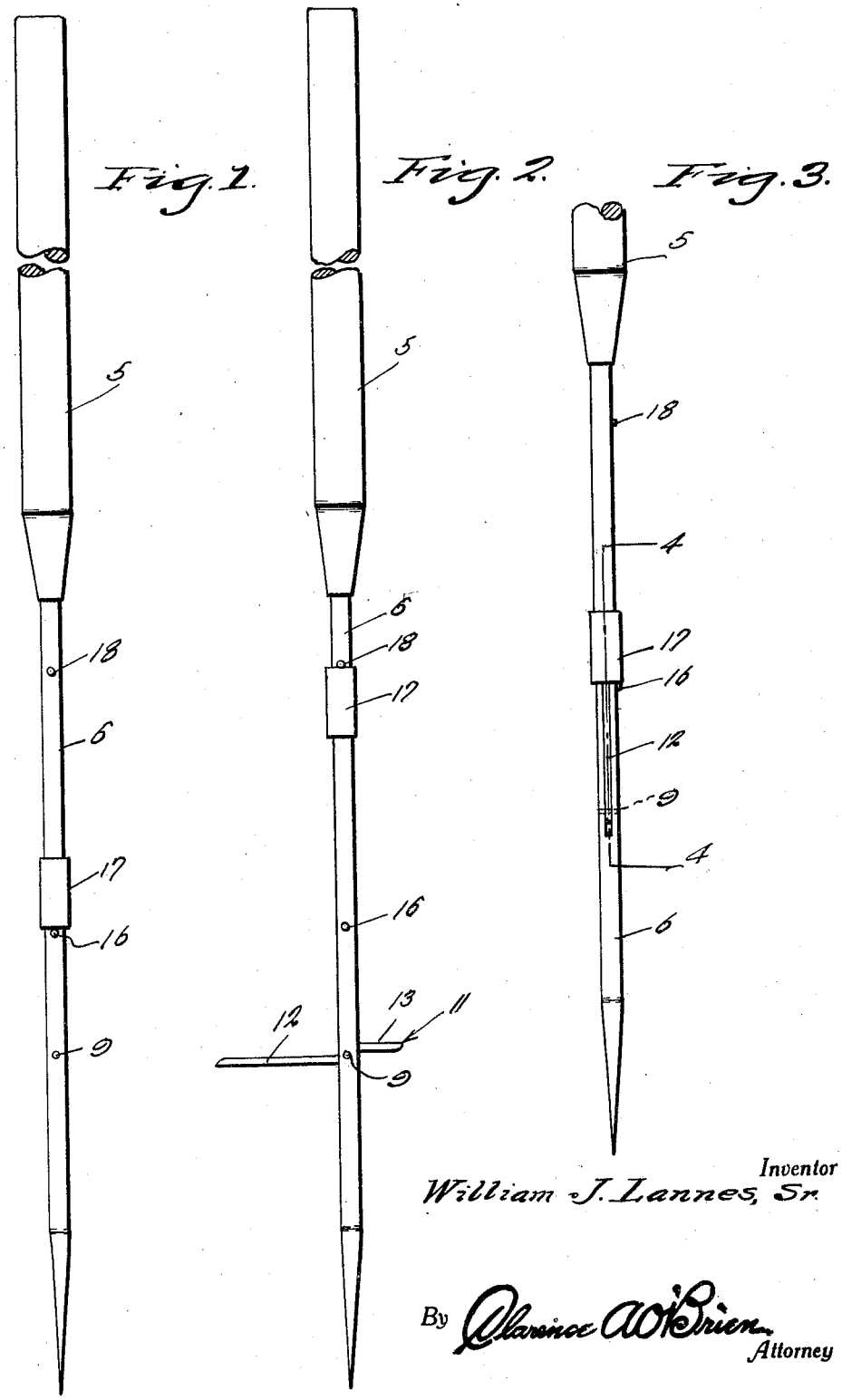
Inventor
*William J. Lannes, Sr.*
By *Clarence A. O'Brien*
Attorney June 13, 1933.  W. J. LANNES, SR  1,913,810
HARPOON
Filed Jan. 9, 1933   2 Sheets-Sheet 2

Inventor
William J. Lannes, Sr.

By Clarence A. O'Brien
Attorney

Patented June 13, 1933

1,913,810

UNITED STATES PATENT OFFICE

WILLIAM J. LANNES, SR., OF NEW ORLEANS, LOUISIANA

HARPOON

Application filed January 9, 1933. Serial No. 650,901.

This invention appertains to new and useful improvements in harpoons such as are employed in spearing flounders and other similar fish and the principal object of the invention is to provide a harpoon which will automatically act when driven into a fish to retain itself in the body of the fish so that when the fish is being retrieved there is practically no likelihood of the fish becoming displaced from the instrument.

Another important object of the invention is to provide an implement of this character which is of simple construction and constructed in such a manner as not to be susceptible to the development of ready defects.

These and various other important objects of the invention will become apparent to the reader of the following specification.

In the drawings:

Figure 1 represents a side elevational view of the harpoon with the retainer in retracted position.

Figure 2 represents a side elevational view of the harpoon with the retainer in extended position.

Figure 3 represents a side elevational view of the harpoon with the retainer in retracted position, this view looking at the side of the harpoon in which the retainer is located.

Figure 4:
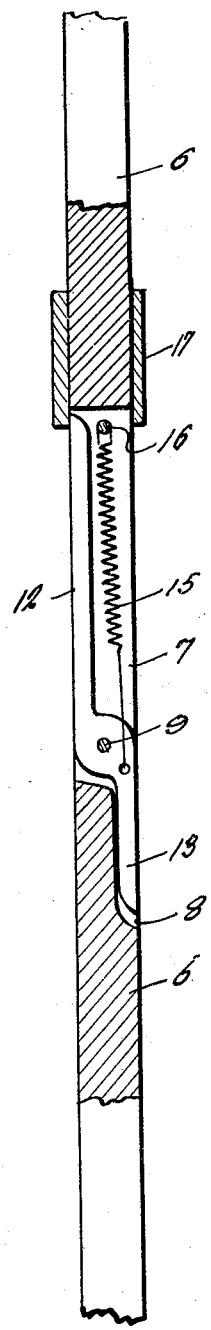
Figure 4 represents an enlarged fragmentary longitudinal sectional view through the harpoon showing the retainer in retracted position.

Referring to the drawings wherein like numerals designate like parts, it can be seen that numeral 5 represents the weighted elongated handle portion of the harpoon while numeral 6 represents the reduced spear extending thereof.

Figure 5:
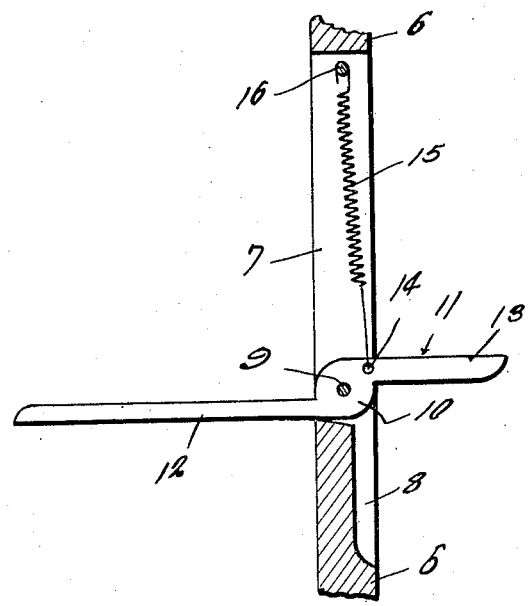
Figure 5 represents an enlarged fragmentary longitudinal sectional view showing the retainer in extended position.
Figure 6:
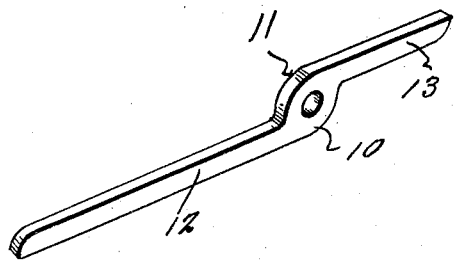
Figure 6 represents a perspective view of the retainer element.

As to the part in Figure 5, this spear extension 6 is provided with a longitudinally extending slot 7 which merges with a groove 8 extending along one side portion thereof. At the point where the slot 7 merges with the groove 8, a pin 9 extends across the slot and through the hub 10 of the retainer which is generally referred to by numeral 11. This retainer hub 10 has an elongated finger 12 projecting tangentially therefrom and from a diametrically opposite point on this hub 10 a shorter finger 13 tangentially projects. The finger 13 adjacent the hub 10 is provided with an opening 14 for receiving one end portion of the spring 15, which spring has its opposite end secured to the transverse pin 16 crossing the slot 7.

While referring to Figure 4, it can be seen that numeral 17 represents a sleeve slidable on the spear point 6, this sleeve being limited in its upward movement by the stop member 18 and in its lower movement by the projecting ends of the aforementioned pin 16. When the sleeve 17 is in its lowermost position and abutting the ends of the pin 16, it is also overlapping the upper end of the retracted finger 12, while the shorter finger 13 is disposed in the groove 8. The spring 15 is now under tension and when the spear part 6 is driven into the fish, and the body of the fish strikes against the sleeve 17 and disengages the sleeve, causing the sleeve to ride upwardly, the retainer 11 will be released so as to engage under the fish in the case of a flounder, and thus prevent the fish from disengaging from the spear portion 6 when the harpoon is being retrieved.

While the foregoing specification sets forth the invention in specific terms, it is to be understood that numerous changes in the shape, size and materials may be resorted to without departing from the spirit or scope of the invention as claimed hereinafter.

Having thus described my invention, what I claim as new is:

A harpoon comprising a handle having a spear portion, this spear portion having a slot therein, a swingable retaining member mounted in the slot, spring means for projecting the retainer to an extended position, and a slidable member on the spear portion normally holding the retainer in retracted position and being engageable by the body of a fish through which the spear portion is pushed, said holding member being in the form of a sleeve surrounding the spear portion and stop members to limit the extent of movement of the sleeve on the spear portion.

In testimony whereof I affix my signature.

WILLIAM J. LANNES, Sr.